Figure 1:
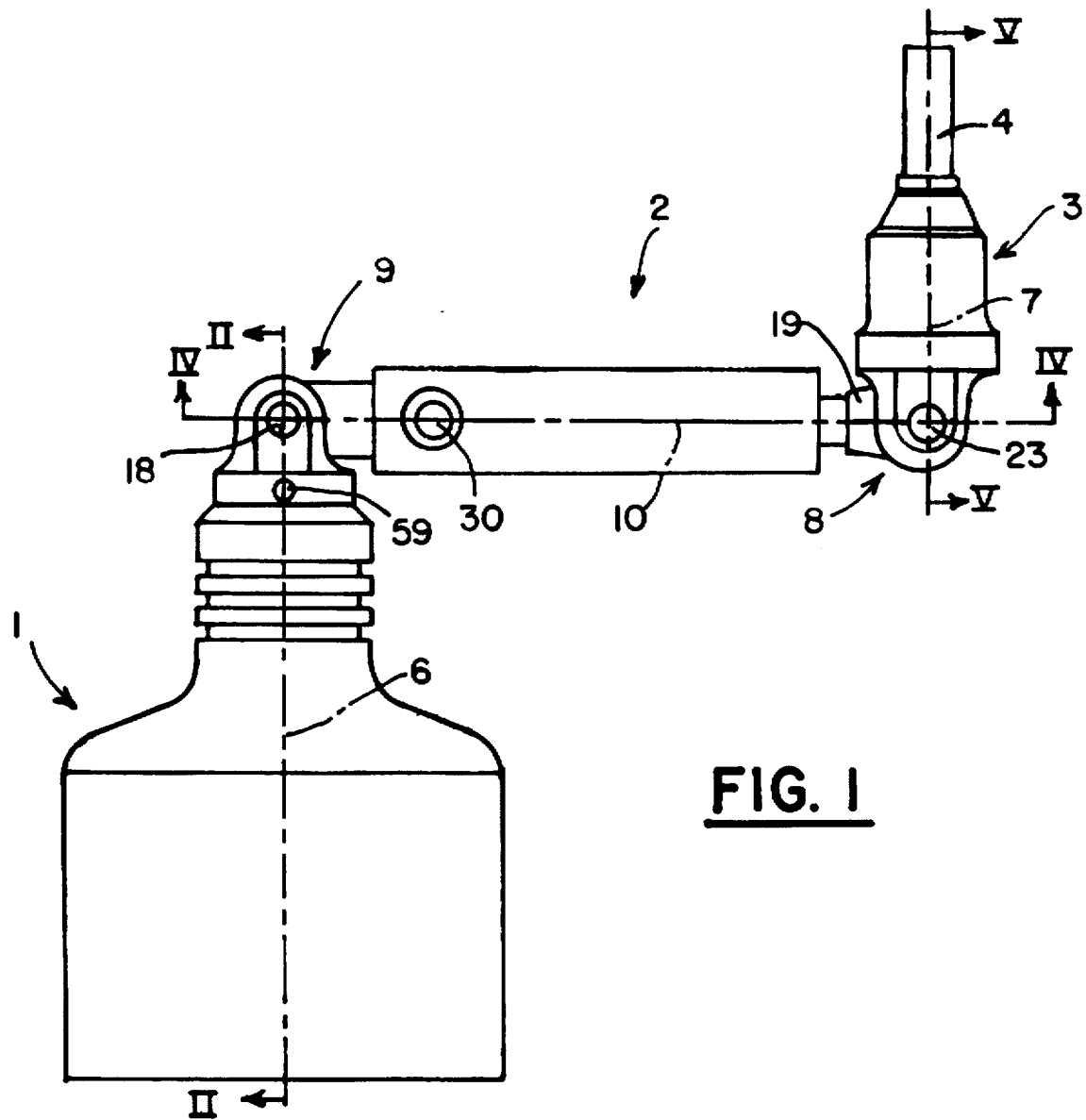

United States Patent [19]

Dreier

[11] Patent Number: 5,791,843
[45] Date of Patent: Aug. 11, 1998

[54] DEVICE FOR CONTROLLING THE ORBITAL ACCURACY OF A WORK SPINDLE

[75] Inventor: Horst E. Dreier, Horb/Neckar, Germany

[73] Assignee: Dreier Lasermesstechnik GmbH, Germany

[21] Appl. No.: 616,988

[22] Filed: Mar. 14, 1996

[30] Foreign Application Priority Data

Mar. 15, 1995 [DE] Germany ................ 195 09 403.4

[51] Int. Cl.[6] ........................... B32Q 17/00
[52] U.S. Cl. ........................... 409/218; 33/642
[58] Field of Search ................ 409/218; 408/75; 33/628, 632, 638, 640, 642, 613, 502, 503

[56] References Cited

U.S. PATENT DOCUMENTS

| | | | |
|---|---|---|---|
| 2,483,743 | 10/1949 | Furrettini | 408/75 |
| 3,826,011 | 7/1974 | D'Aniello | 33/642 |
| 4,435,905 | 3/1984 | Bryan . | |
| 5,036,595 | 8/1991 | Nevery | 33/642 |
| 5,052,115 | 10/1991 | Burdekin . | |
| 5,111,590 | 5/1992 | Park . | |

FOREIGN PATENT DOCUMENTS

| | | |
|---|---|---|
| 0 258 471 A | 3/1988 | European Pat. Off. . |
| 0 329 635 A | 8/1989 | European Pat. Off. . |
| 0 508 686 A | 10/1992 | European Pat. Off. . |
| 0 526 056 A | 2/1993 | European Pat. Off. . |
| 2034635 | 11/1980 | Germany ................ 33/638 |

*Primary Examiner*—Daniel W. Howell
*Attorney, Agent, or Firm*—Gary M. Nath; Nath & Associates

[57] ABSTRACT

A device for controlling the accuracy of the orbit along which a work spindle of an NC machine is moved during the manufacture of high-precision circular bores, inner and outer surfaces as well as radii essentially consists of a control unit (1), a clamping element (3) as well as an intermediate piece (2). The clamping element is connected to the work spindle of the machine tool and the control unit is placed on the work table of the machine tool, at the location at which the workpiece is held during the machining. The intermediate piece (2) is formed by a transducer (24) or comprises a transducer. If deviations from the nominal radius occur, the transducer transmits a signal to an amplifier, said signal being amplified and subsequently displayed and/or recorded. A shaft encoder (61) allows the precise determination and, if so required, registration of the respective measuring position. A special routing of the measuring cable and an internal transmission by means of a slip ring (66) and sensors (67), e.g., contact springs, allows multiple revolutions of the work spindle around the center (6) of the orbit without risking damage to the measuring cable.

21 Claims, 4 Drawing Sheets

DEVICE FOR CONTROLLING THE ORBITAL ACCURACY OF A WORK SPINDLE

The invention pertains to a device for controlling the accuracy of the orbit along which a work spindle or the table of a CNC machine is moved during the manufacture of high-precision circular bores, inner and outer surfaces as well as radii, with an electronic transducer that is arranged in the radial direction of the orbit and whose measured value is amplified by means of an amplifier and subsequently displayed and/or recorded, wherein the transducer, the measuring direction of which extends radially to the spindle axis, can be connected to the work spindle of the CNC machine. One such device from the applicant is already known. This particular device is used in connection with a high-precision reference cylinder that is placed on the work table of the NC machine, with the transducer being guided along the outer cylindrical surface of said reference cylinder. In this case, the geometric axis of the reference cylinder is arranged at the location at which the geometric longitudinal axis of the bore, the outer surface or the like to be processed is subsequently situated. During the machining of this outer surface or the like, the spindle with the machining tool, e.g., a milling cutter, travels around this outer surface along the controlled orbit. It should be quite clear that the machining accuracy increases proportionally to the accuracy with which the orbit of the machining tool is maintained or in accordance with the Ballbar method (Maschinenmarkt 101 (1995) 3, p. 22 ff).

The operators of NC machine tools continuously increase the requirements with respect to the accuracy of the machine and the machining efficiency. In addition to an increased positioning accuracy, surface evenness and alignment, this means that the requirements with respect to the mutual uniformity of the CNC axle drives are also increased. The aforementioned uniformity is of particular importance in the manufacture of bores, radii, circular inner and outer fittings as well as any type of curved surfaces by means of milling. The manufacturing accuracy of bores, radii and curved surfaces can be increased proportionally to the uniformity of the CNC axle drives, without requiring any additional expenditures. This uniformity of the axle drives represents an essential prerequisite for the high-speed machining required by numerous companies. The main advantage of high-speed machining can be seen in the fact that subsequent manual processes as well as grinding and polishing processes, are, if at all, only required to a limited extent.

However, such a high precision in production can be attained only if the NC machines are regularly inspected and calibrated with high-precision measuring devices. The manufacture of high-precision circular bores, etc., requires an inspection of the CNC machine with the aid of a circularity test. Only with the aid of the latter is possible to determine the accuracy of an orbit in a rational and economical fashion.

The initially described control device requires different reference cylinders for different diameters. In addition, this particular device also requires a guide arm.

Consequently, the invention is based on the objective of improving a control device of the initially mentioned type in such a way that the aforementioned disadvantages are eliminated and, in particular, the use of a reference cylinder can be relinquished without having to accept disadvantages with respect to the accuracy of the orbital measurement and adjustment caused by the magnetic holding arrangement.

According to the invention, this objective is attained by realizing the device according to the preamble of claim 1 in accordance with the characteristics disclosed in the characterizing portion of this claim.

Instead of a reference cylinder, the control unit of this device is arranged on the machine table, with the geometric axis of said control unit being arranged at the location at which the geometric axis of the reference cylinder in the previously described device would be situated, or, in other words, at the location at which the geometric axis of the bore or outer surface of the workpiece to be processed or produced is subsequently situated. This geometric axis extends parallel to that of the spindle which accommodates the machining tool. However, both geometric axes are offset relative to one another in the lateral direction, with the lateral spacing corresponding with the effective length of the transducer or a component that accommodates said transducer. Except for this control device, no additional element and auxiliary devices are required.

Only the housing of the transducer is precisely fixed on the machine table, while the inner part of said transducer rotates inside of the housing about a plane perpendicular to the plane of the table when traveling along the orbit or around the work spindle. A suitable cable routing and a suitable electric connection between the control device and a computer or PC prevents the twisting and coiling of the measuring cable.

A refinement of the invention is disclosed in claim 2. The joints mentioned in this claim make it possible to guide the clamping element that is rigidly connected to the work spindle of the machine along an orbit around the geometric axis of the control unit, although both joints are mechanically connected by means of an intermediate element of the control device which extends transverse to the geometric axis of the control unit, is aligned radially to the spindle and the control unit and comprises the transducer. However, these two joints are only important during the arrangement of the device on the work table and on the spindle of the machine tool. A rotational movement does not take place in these joints during the measurement.

An additional embodiment of the device is described in claim 3. The term "end of the transducer situated opposite to the spindle" used in this claim should, as in claim 2 and the other claims, be interpreted to mean that said term also refers to an "intermediate piece" if the transducer is arranged in such an intermediate peace and the transducer itself does not contain any joint halves. It is assumed that the latter represents the typical situation.

Bearing combinations consisting of spherical disks and spherical liners without play are known in numerous variations. Consequently, these bearing combinations are not described in detail at this point. However, said bearing combinations are distinctly illustrated in the figures. In any case, these bearings are precision bearings since their quality inevitably affects the measuring result. These bearings operate without play and are prestressed. In this respect, an additional improvement of the device is disclosed in claim 4.

The pin-like part of the rotatable inner part of the control unit naturally must be arranged in the housing of the control unit with the required optimal quality. In this case, commercial bearings or bearing units can also be used. However, this does not preclude combining said bearings or bearing units with the other structural components of the device, e.g., such that the inner race of the radial bearing is eliminated and replaced with a structural component of the required quality. In this respect, additional developments of the invention are disclosed in claims 5 and 6. A quite compact construction can be attained if the nut mentioned in claim 6 is realized in the form of an element of the lower axial bearing. The same measure can also be advantageously applied in the upper axial bearing.

A particularly preferred embodiment of the invention proposes that all bearing points of the device be encapsulated, i.e., that they be at least dust-proof, but preferably also well protected against other damaging influences, e.g., moisture. Regarding the dust-proof encapsulation, one can fall back on proven constructions that are available on the market.

An additional embodiment of the invention is characterized by the fact that the pin-like part of the inner part of the control unit comprises a central cable duct, with a radial duct of the articulated fork of the inner part ending in said central cable duct. The cable that is connected to or originates from the transducer consequently is guided along the outside of the joint between the control unit and the intermediate piece such that it extends into the interior of the control unit via the central cable duct. Consequently, the cable is no longer twisted during the measurement, so that the clamping element can "orbit" around the control unit several times if so required for metrological reasons.

A particularly preferred embodiment of the invention proposes that the housing of the control unit be hollow and that a shaft encoder be arranged in the interior of said housing, with the lower end of the rotatable inner part of the control unit which protrudes into the interior of the housing centrally engaging with said shaft encoder. This shaft encoder makes it possible to determine precisely and record at which location of the orbit the geometric axis of the work spindle or the clamping element is currently situated. In addition, this measure allows the precise localization of any "defect" that may be detected.

A refinement of this construction is disclosed in claim 12. The shaft-angle encoder mentioned in this claim is generally known and available on the market. However, the shaft-angle encoder must be adapted to the remaining construction if necessary. It is of primary importance that a reference marking and/or a directional identification be provided. This measure allows a measurement in the forward and backward direction, i.e., in both senses of rotation. It is possible to select a very sensitive device of this type, e.g., a device with 6000 pulses over an angle of 360°. The rotational speed is of no consequence in a shaft-angle encoder of this type. On the contrary, the rotational speed can be easily varied. This variation of the rotational speed applies to the rotation in only one sense of rotation as well as the rotation forwards and reverse. Previously used shaft-angle encoders that determine the angular position as a function of the time do not allow a measurement in the reverse rotational sense. In this respect, the embodiment of the device according to claim 12 is particularly practical.

A particularly advantageous variation of the device is described in claim 13. The safe transmission of the data from the device according to the invention to a PC or another electronic device is attained by to the collective rotation of the amplifying board and the inner part of the control unit, in connection with the derivation of the measured value.

It is particularly practical if the transducer is realized in the form of a high-resolution inductive transducer that comprises an electric coil and a ferromagnetic core, in particular with an amplifying board. Transducers of this type are very precise. They are able to detect even very small path changes and consequently very slight deviations from the ideal orbit.

Each transducer is inspected very precisely before its delivery or installation in a measuring device, e.g., the control device according to the invention. This inspection makes it possible to detect the slightest errors and notify the purchaser of a commercially available transducer which deviations from the ideal value occur within which region of the measuring distance. If the concerned range of the transducer is subsequently used for a measurement, this specific error can be taken into consideration by a computer, i.e., excluded form the measuring result. In this respect, a very advantageous refinement of the invention is described in claims 16 and 17.

During the measurement, the control unit is rigidly connected to, for example, the machine table of the machine tool. In addition, the clamping element is inserted, in particular clamped, into a chucking fixture, a clamping chuck or another known chucking implement of the work spindle. If the work table were displaced relative to the spindle in a thusly control device mounted in this way, said adjustment generally would lead to the destruction of the control device. In order to prevent this costly destruction, an additional embodiment of the invention proposes that the clamping element be provided with a predetermined breaking point. If the machine tool is not properly adjusted, the structural element of the control device which is provided with said predetermined breaking point fractures such that additional damages are prevented. In this case, the aforementioned structural element needs only be replaced. It is sensible to arrange the predetermined breaking point on a structural element that can be manufactured and replaced in an inexpensive fashion, with said structural element being mounted such that it can be replaced rapidly in without high expenditures. In this respect, a practical construction is described in claim 19.

The control device is provided with a second safety against damages in case of inappropriate handling of the machine tool. This second safety is described in claim 21. According to this claim, the control unit is provided with at least one magnet that makes it possible to retain the control unit on the ferromagnetic work table of the machine tool. This magnet can consist of at least one permanent magnet. On the other hand, the magnet can also be realized in the form of a magnetic chuck as known from numerous measuring and holding devices that comprise permanent magnets. Naturally, care must be taken that electronic components, in particular in the interior of the control unit, are not influenced by the magnet(s).

Additional embodiments of this control device as well as the different functions and advantages resulting thereof are described below with reference to one embodiment of the invention.

Figure 2:
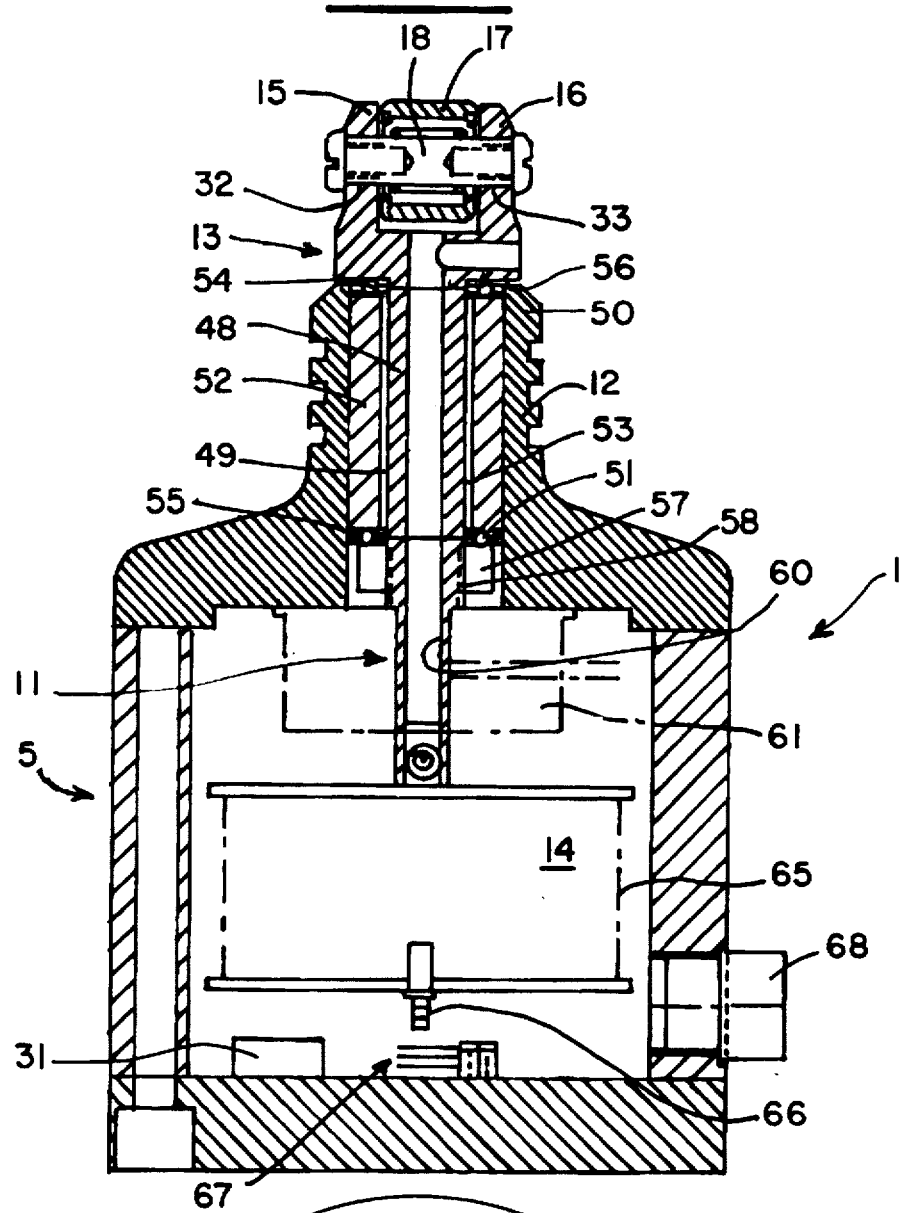
Figure 3:
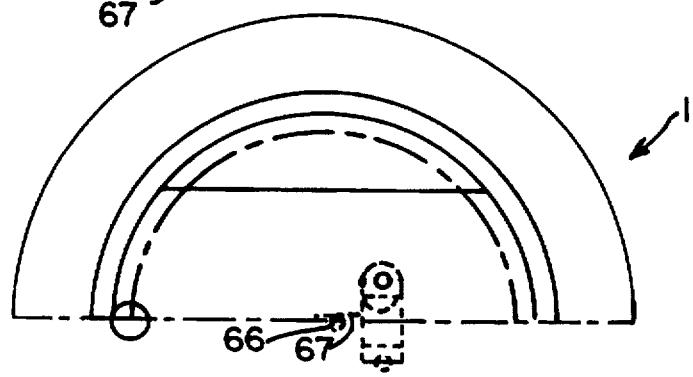
Figure 4:
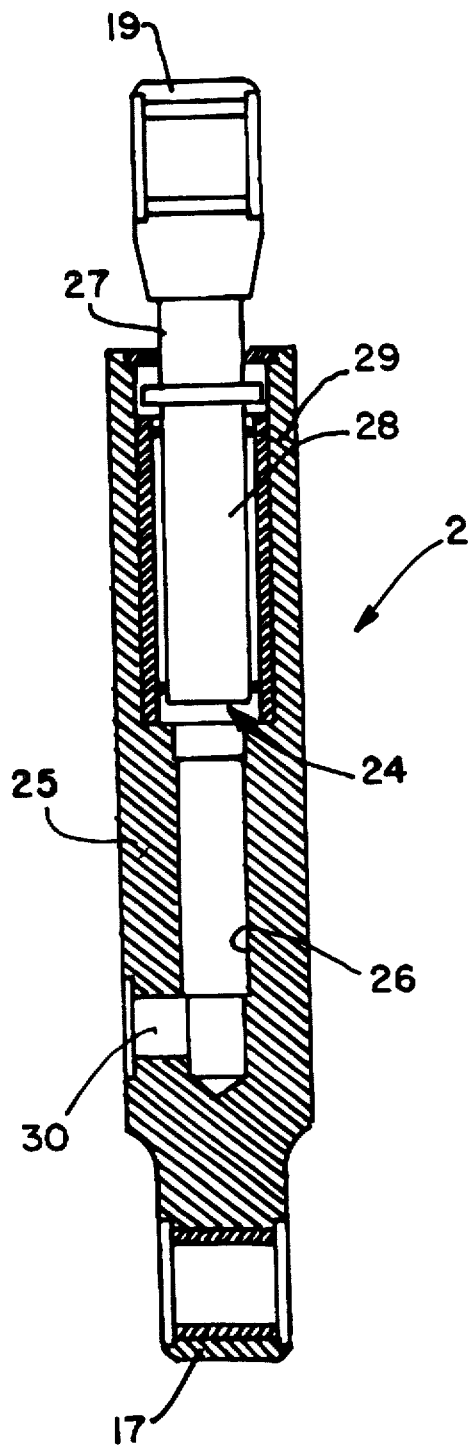
Figure 5:
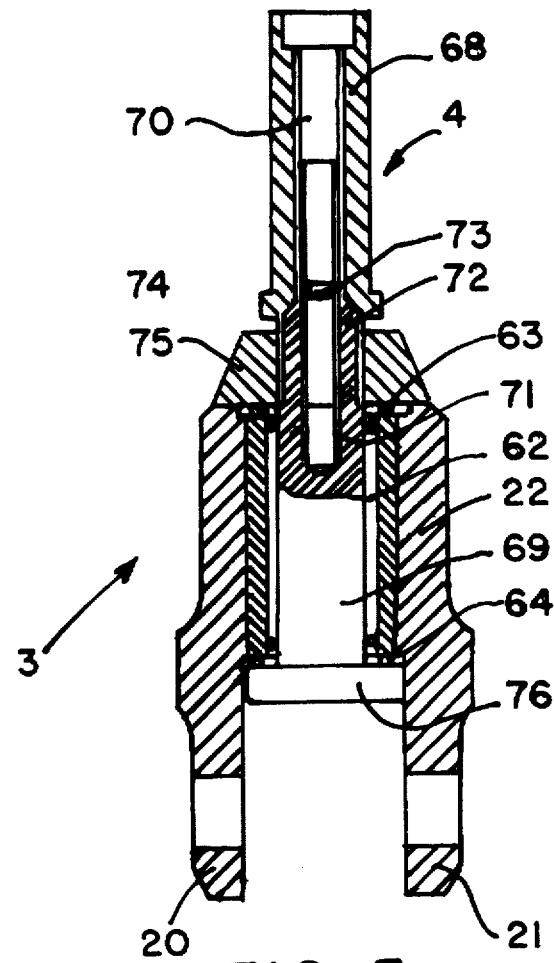
Figure 6:
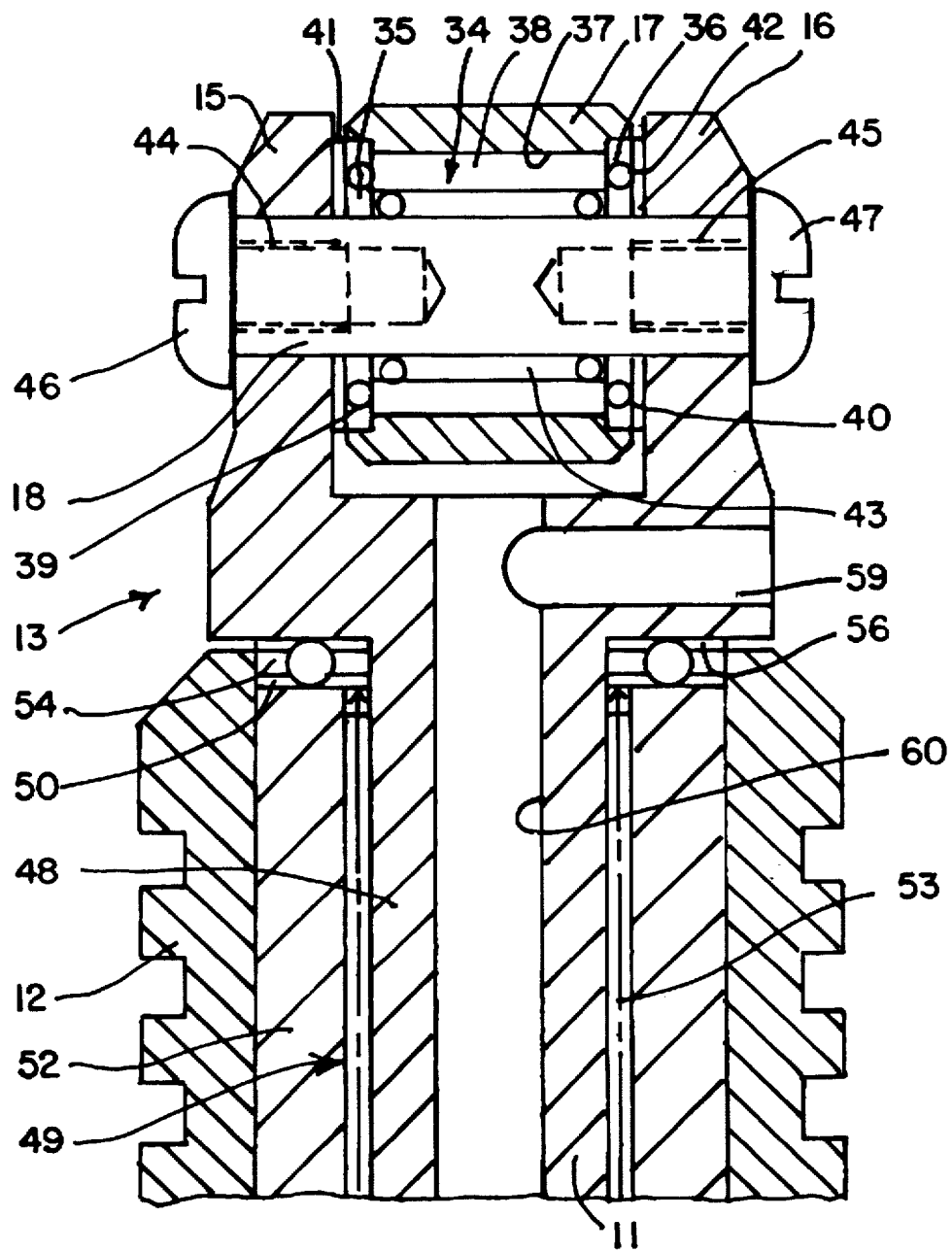

One such embodiment is illustrated in the figures. The figures show:

FIG. 1, a side view of the control device;

FIG. 2, an enlarged representation of a section along the line II—II in FIG. 1;

FIG. 3, a schematic representation of half of a top view of the central part shown in FIG. 2;

FIG. 4, a slightly enlarged representation of a longitudinal section through the intermediate piece of the device along the line IV—IV;

FIG. 5, an enlarged representation of a longitudinal section along the line V—V in FIG. 1, and FIG. 6, an enlarged representation of a detail in FIG. 2.

The essential elements of the device according to the invention for controlling the accuracy of the orbit along which a work spindle of an NC machine is moved during the manufacture of high-precision circular bores, inner and outer surfaces as well as radii are a control unit 1, an intermediate piece 2 and a clamping element 3. The latter is connected to a not-shown work spindle of the NC machine which serves for machining workpieces not shown. In this case, a clamping pin 4 is inserted and clamped into a chucking fixture, a clamping chuck or a similar chucking implement that is arranged on the work spindle of the machine tool. The control unit 1 or its housing 5 is held on the ferromagnetic work table of the machine tool, in particular with the aid of a magnetic force. The arrangement is realized in such a way that the geometric longitudinal axis 6 of the control unit is arranged at exactly the same location at which the geometric axis of, for example, a bore or a cylindrical outer surface of the workpiece to be produced or processed is situated during the machining of the workpiece. When machining such an outer surface, a corresponding machining tool is situated in the tool receptacle of the work spindle instead of the clamping element 3. During the machining, the geometric longitudinal axis 7 of the work spindle, which also corresponds to the geometric longitudinal axis of the clamping element 3 during the control process orbits around the geometric longitudinal axis 6 of the control unit 1 or, at a later time, the geometric longitudinal axis of the workpiece bore or the outer surface of the workpiece. For reasons of simplicity, the following description refers to an instance in which a cylindrical outer surface of a workpiece is machined or produced with the aid of a machining tool arranged in the work spindle. This machining tool can, for example, be a milling cutter that is moved about the geometric axis 6 along the orbit to be controlled. Since the machine tool is an NC machine, the advance of the tool along the orbit is realized via a superimposed movement in the x-direction and the y-direction of the coordinate system, e.g., in the plane of the support surface for the control unit 1. In this case, the problematic locations are those at which the movement transforms from a plus x-direction into a minus x-direction.

Since the requirements with respect to the uniformity of the CNC axle drives continuously increase, it is necessary to realize the superimposed advance movement in such a way that it corresponds to the theoretical orbit. If the work spindle is aligned before the machining relative to the geometric longitudinal axis 6 with the aid of the control device according to the invention in such a way that the moving path corresponds to the theoretical orbit as precisely as possible, it is ensured that an optimal machining or manufacture of the outer surface is subsequently attained. If the first measurement or even several measurements indicate that this optimal theoretical orbit has not yet been attained, the position of the spindle can be corrected until the control unit indicates the desired optimal value. The control device according to the invention makes it possible to attain a high-precision orbit in a rational and inexpensive fashion.

The two respective ends of the intermediate piece 2 are connected to the clamping element 3 via a first joint 8 and the control unit 1 via a second joint 9, namely in a pivoted fashion. The pivoting planes respectively lie in the plane of projection of FIG. 1. During the measurement, the geometric longitudinal axis 7 of the clamping element 3 extends parallel to the geometric longitudinal axis 6 of the control unit 1. The geometric longitudinal axis 10 of the intermediate piece 2 extends perpendicular to the two aforementioned longitudinal axes and lies in the same plane.

The essential elements of the control unit 1 are the previously mentioned housing 5 and a rotatable inner part 11 that is arranged concentric to said housing. This rotatable inner part extends through a tubular projection or neck 12 of the housing 5 which protrudes upward in FIG. 2. The upper end of this inner part carries an articulated fork 13, with its lower end protruding into the interior 14 of the housing 5. The left bearing eye 17 of the intermediate piece 2 according to FIG. 1 engages between the two fork tines 15 and 16. A bearing journal 18 extends laterally through this entire arrangement. An additional or right bearing eye 19 that engages between the fork tines 20, 21 of a bearing fork 22 at the lower end of the clamping element 3 according to FIG. 1 is situated at the right end of the intermediate piece 2 shown in FIG. 1. This joint comprises a bearing journal 23. The construction of the joints 8 and 9 which is described in detail below is preferably identical because this measure allows a more cost-efficient manufacture.

It was already explained above that the curved path of the geometric axis 7 of the clamping element 3 represents the orbit to be controlled. The geometric axis 6 of the control unit 1 extends through the central point of said orbit. The radius of this orbit corresponds to the lateral distance between the two geometric axes 7 and 6. The lateral distance between the two geometric axes 6 and 7 is changed if deviations from the theoretical orbit occur. A transducer 24 of the intermediate piece 2 measures these changes in a very precise fashion. It should be quite clear that the transducer 24 itself can also form the intermediate piece. However, in the embodiment shown, the transducer is inserted into a two-part intermediate piece. The outer, larger part 25 of this intermediate piece 2 comprises the left bearing eye 17 according to FIG. 1, with the right bearing eye 19 according to FIG. 1 being situated on the smaller, inner part 27 of the intermediate piece 2 which is inserted into a bore 26.

The transducer 24 preferably is a high-resolution inductive transducer that comprises an electric coil 28 and a ferromagnetic core 29.

A change in the penetration depth of the ferromagnetic core into the coil 28 or vice versa causes a change in the electric measured value. In contrast to the illustration according to FIG. 4, the coil 28 can also surround the ferromagnetic core. In this case, it is practical to arrange the latter on the inner part 27 of the intermediate piece 2, however. The electric lines leading to the transducer 24 extend through the central axial bore 26 of the outer part 25 and a radial bore 30 that is assigned to the lower end of the aforementioned axial bore in FIG. 4. The transducer 24 is protected against external influences by means that are indicated in the figure, but not described in detail. In addition, the transducer is calibrated and comprises an amplifying board. In order to increase the measuring accuracy, the deviations of the transducer 24 are determined and stored in a computer in the form of correction values, with the remaining measurement data also being fed to said computer.

A coding switch 31 is schematically illustrated in FIG. 2. This coding switch is intended to prevent that, the false correction value of the respective transducer 24 from being utilized in the computer if several such control devices by one and the same company are used.

The bearing journal 18 is arranged directly in the bores 32 or 33 of the cable tines 15 or 16. According to FIG. 6, one radial bearing 34 as well as two axial bearings 35 and 36 are situated in the annular space between the central region of the bearing journal 18 and the bore of the bearing eye 17. The two axial bearings 35 and 36 are formed by inserting a sleeve 38 into the bore 37 of the bearing eye 17, with one respective cage with balls 39 or 40 being assigned to the two ends of the aforementioned sleeve. The outer sides of the balls respectively adjoin a ring 41 or 42 that is inserted between the respective fork tines 15 or 16 and the bearing eye 17. The bolt 18 extends through the center of these two rings.

The radial bearing 34 consists of a cage 43 with two parallel, annular rows of balls. The inner sides of said balls adjoin the surface of the bolt 18, with the outer sides of the balls adjoining the bore of the sleeve 38. The rings 41 and 42 simultaneously serves to encapsulate this bearing.

Threading 44 or 45 is arranged in each end of the bearing journal 18. A screw 46 or 47, the head of which is supported on the outside of the assigned fork tine 15 or 16, is screwed into each thread. The intensity with which the fork tines 15 and 16 are elastically pressed inward increases proportionately to the force with which the screws are inserted. This measure makes it possible to eliminate 100% of the axial play. Naturally, this also contributes to the sealing effect of this bearing group.

The pin-like part 48 of the rotatable inner part 11 of the control unit 1 is arranged in the neck 12 of the housing 5 of the control unit 1 in a rotatable as well as axially immovable fashion by means of the cylindrical liner 49 as well as two cylindrical disks 50 and 51 (FIGS. 2 and 6). For this purpose, a sleeve 52 is inserted, in particular pressed, into the neck 12. A liner with the balls 53 of the cylindrical liner 49 is situated between the aforementioned sleeve and the outer surface of the pin-like part 48. The balls are respectively retained in a cage 54 or 55 and adjoin the faces of the sleeve 52. In addition, the shoulder 56 at the transition from the pin-like part 48 to the articulated fork 13 forms an axial support surface for the upper cylindrical disk 50. The balls of the lower cylindrical disk 51 are supported from below by a nut 57 that is screwed onto a thread 58 of the pin-like part 48.

The cable that extends through the radial bore 30 of the intermediate piece 2 also extends through a radial channel 59 as well as a central channel 60 of the rotatable inner part 11 of the control unit 1, i.e., it extends past the outside of the second joint 9 (FIG. 1). The cable extends from this location to the computer or PC.

A shaft encoder 61 that is only schematically indicated in the figures is situated in the interior 14 of the housing 5 of the control unit 1. This shaft encoder is fastened on top of the interior of the housing 5, with the lower end of the pin-like part 48 of the rotatable inner part 11 centrally extending through said shaft encoder. The encoder preferably is realized in the form of a shaft-angle encoder that, in particular, is provided with a reference marking and/or a directional identification. This measure not only allows an exact determination of the initial point of the rotational movement, but also the rotating direction and the rotational speed. In the embodiment shown, 6000 pulses are assigned to a rotation over 360°. The exact angular position of the measuring sensor can be determined in this fashion. This angular position can be precisely measured independently of the respective rotational speed of the inner part 11 or the advance speed of the machine spindle. A change in the moving speed does not affect the measuring result. This particular aspect is very important if a orbital offset that is not recorded in the form of precise angular positions occurs during the reversal of the moving direction. This is of primary importance in control procedures that make it possible to compensate the peaks that occur at the reversal points by means of certain parameters. Due to the directional identification of the shaft encoder, it is possible to carry out automatic measurements in different directions.

A cylindrical liner 62 and two cylindrical disks 63, 64 are arranged between the clamping pin 4 and the articulated fork 22 of the clamping element 3. In this respect, the construction can correspond to that within the region of the neck 12 of the housing 5. All previously described bearings are at least dust-proof and preferably also protected against moisture.

An amplifying board 65 is connected to the lower end of the rotatable inner part 11 of the control unit 1 such that both components rotate collectively, said amplifying board being only schematically indicated in FIG. 2 by two dot-dash lines. The output signals are fed to a multi-track slip ring 66 and are measured at this location by means of contact springs 67 that are rigidly connected to the housing. The latter are illustrated in FIG. 2 underneath the slip ring 66 for reasons of better intelligibility. An electric line, not shown leads from the contact springs 67 to a plug connection 68 of the control unit 1. An external cable that leads to a computer or PC can be connected to this plug connection. Due to the previously described routing of the measuring cable inside of the device, measurements can be carried out over several hours or even days. The reference marking on the shaft encoder 61 makes it possible to always begin the measurements always at the same angular position, even in different rotating directions. This measure allows a direct acquisition of the data, either successively or within certain intervals in an automated fashion.

The clamping pin 4 of the clamping element 3 is realized in the form of a two-part component. It comprises an outer, sleeve-shaped part 68 as well as an inner part 69 that is assigned to the bearings 62, 63 and 64. These two parts are held together with the aid of a central screw 70 that is screwed into a thread 71 of the inner part 69. The head of said screw is supported on a shoulder-like widening of the bore in the outer part 68. The centering between the inner and outer part of the clamping pin 4 is realized by means of corresponding cones 72. The screw 70 is provided with a predetermined breaking point 73. If the control device and, in particular, the machine tool are handled inappropriately, the screw 70 fractures at this location such that more extensive damage to the control device is prevented. The fastening of the housing 5 of the device on the machine table with the aid of not-shown magnets on the housing 5 serves for the same purpose.

A thread 74, onto which nut 75 is screwed, is arranged on the inner part 69 of the clamping pin 4 within the region of the cones 72. This nut and an enlarged head 76 at the lower end of the inner part 69 make it possible to eliminate the axial play between the two spherical disks 63 and 64.

I claim:

1. In an NC machine having a spindle used in a high precision manufacturing process for machining circular bores, inner and outer surfaces, and radii of a workpiece, wherein the improvement includes a device for controlling the accuracy of the spindle's orbit, said device comprising:

an electronic transducer connected on a first end to the spindle of the NC machine by a clamping element, said transducer producing signals to be used as measured values which are measured in directions extending radially from the spindle axis, wherein said signal is amplified by an amplifier and subsequently displayed and/or recorded, and a control unit comprising a housing which accommodates a rotatable inner part, said rotatable inner part having an upper region that protrudes beyond the housing, said upper region connected to a second end of said transducer opposite to the first end of said transducer, said transducer being connected to the upper region so that said transducer and the rotatable inner part rotate collectively through a central part of the rotatable inner part which is also parallel to the geometric axis of the spindle.

2. A device according to claim 1, wherein a first end of the transducer which faces the spindle is connected to a clamping element with an articulated first joint, and the second end of the transducer which is situated opposite to the spindle is connected to the rotatable inner part of the control unit with an articulated second joint.

3. A device according to claim 2, wherein the control unit is situated opposite to the spindle and is in the form of a bearing eye that engages into an articulated fork within the upper region of the inner part of the control unit with bores of the bearing eye, said fork having tines and the fork tines accommodating a bearing journal that extends through a bearing combination of a radial bearing and two axial bearings.

4. A device according to claim 3, wherein the fork tines can be elastically pressed against one another by means of at least one screw that engages axially into a bearing journal thread so as to eliminate axial play.

5. A device according to claim 1, wherein said housing has a tubular region with a central bore extending therethrough and wherein a pin-like part of the rotatable inner part longitudinally extends through said central bore of the housing of the control unit, with a cylindrical liner and two cylindrical disks being arranged within said tubular region.

6. A device according to claim 5, wherein a nut that is screwed onto a thread of the pin-like part of the inner part eliminates the play of both cylindrical disks.

7. A device according to claim 6, wherein the nut forms part of the lower cylindrical disk during the operation of the device.

8. A device according to claim 5, wherein a sleeve that accommodates the pin-like part of the inner part partially forms bearing surfaces, and is located within the central bore of the housing.

9. A device according to claim 1, wherein the bearings are encapsulated.

10. A device according to claim 5, wherein the pin-like part of the inner part comprises a central cable duct, with a radial duct of the articulated fork of the inner part ending in the aforementioned cable duct.

11. A device according to claim 1, wherein the housing (5) of the control unit (1) has an interior cavity in which a shaft encoder is mounted and into which protrudes the inner part engaging with said shaft encoder.

12. A device according to claim 11, wherein the shaft encoder is a shaft-angle encoder that has a reference marking and/or a directional identification.

13. A device according to claim 10, wherein an output of an amplifying board is connected to at least one multitrack slip ring, and is connected to a free, lower end of the rotatable inner part during the operation of the device and that sensors are fastened on a base in the interior of the housing, and cooperate with the slip ring.

14. A device according to claim 2, wherein the first joint between the clamping element and the first end of the intermediate piece which faces the spindle and the bearing correspond to the second joint, and the first joint having an articulated fork that is arranged on the clamping element.

15. A device according to claim 14, wherein the transducer is a high-resolution inductive transducer that comprises an electric coil and a ferromagnetic core with an amplifying board.

16. A device according to claim 1, wherein deviations of the transducer are determined and stored in a computer in the form of correction values.

17. A device according to claim 16, wherein a coding switch in the housing properly allocates the correction values of the transducer to a control device.

18. A device according to claim 1, wherein the clamping element is provided with a predetermined breaking point.

19. A device according to claim 18, wherein the predetermined breaking point is arranged on a central screw of the clamping element which extends centrally through a two-part clamping pin.

20. A device according to claim 19, wherein the clamping pin is arranged without play in the body of the articulated fork by means of one cylindrical liner and two cylindrical disks which define a plurality of bearing points, with the bearing points being encapsulated.

21. A device according to claim 1, wherein the control unit is mounted on a support with at least one magnet in the form of a magnetic chuck.

* * * * *